Figure 1:
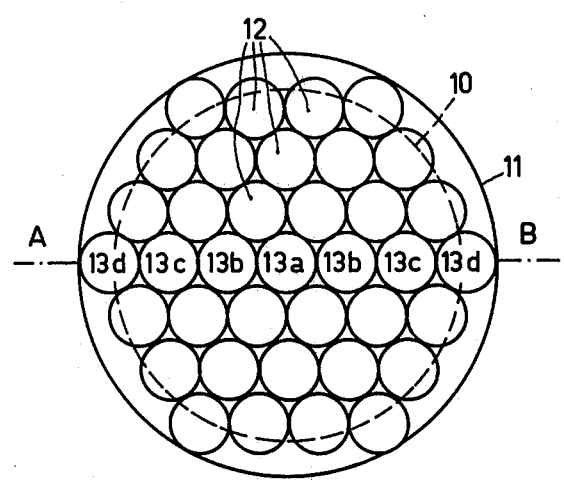

United States Patent [19]

Pergrale et al.

[11] 4,284,891
[45] Aug. 18, 1981

[54] GAMMA CAMERA

[75] Inventors: Jean Pergrale, Paris; Michel Jatteau, Lesigny, both of France

[73] Assignee: U.S. Philips Corporation, New York, N.Y.

[21] Appl. No.: 99,456

[22] Filed: Dec. 3, 1979

[30] Foreign Application Priority Data

Dec. 5, 1978 [FR] France .................. 78 34169

[51] Int. Cl.³ .............................. G01T 1/20
[52] U.S. Cl. .................. 250/363 S; 250/368
[58] Field of Search ............ 250/363 S, 366, 367, 250/368, 483, 484, 486

[56] References Cited

U.S. PATENT DOCUMENTS

| 2,695,964 | 11/1954 | Schepker | 250/368 |
| 3,073,954 | 1/1963 | Carlson et al. | 250/368 |
| 3,723,735 | 3/1973 | Spelha et al. | 250/363 S |
| 3,814,938 | 6/1974 | Martone et al. | 250/363 S |
| 4,090,081 | 5/1978 | Takami et al. | 250/368 |

Primary Examiner—Alfred E. Smith
Assistant Examiner—Janice A. Howell
Attorney, Agent, or Firm—Thomas A. Briody; Robert T. Mayer; Jack E. Haken

[57] ABSTRACT

The peripheral part of the optical block of a gamma camera, which is formed by the scintillation crystal and the optical conductor, is provided with a diffusive light reflector, the reflection and optical diffusion properties of which are combined in relation to the wavelength of the scintillation light so that signal/distance curves for each of the photomultipliers used are substantially coincident within the useful field of the camera. This improvement results in a suitable compromise between on the one hand linearity and spatial uniformity and on the other hand spatial and energetic resolution of the gamma camera.

3 Claims, 4 Drawing Figures

GAMMA CAMERA

The invention relates to a gamma camera which comprises a scintillation crystal, an optical conductor which is arranged against the scintillation crystal, a network of photomultiplier tubes whose entrance faces are situated opposite the optical conductor, the transverse dimension of the optical conductor being larger than that of the scintillation crystal, the assembly formed by the optical conductor and the scintillation crystal being accommodated in a metal housing which is open at the side of the photomultipliers, the entrance surfaces of peripheral photomultipliers projecting beyond the surface of the scintillation crystal, the useful field of the camera being defined by an aperture which is arranged at the side of the scintillation crystal.

A gamma camera of this kind is known from U.S. Pat. No. 3,011,057 and comprises an optical block with a disc-shaped scintillation crystal which is arranged against a disc-shaped optical conductor on which a network of photomultipliers is arranged for detecting scintaillations caused by gamma radiation incident in the scintillation crystal. The useful field of such a gamma camera is limited by an aperture arranged in front of the scintillation crystal. Electronic circuits combine the output signals of the photomultipliers in order to assign position coordinates to the detected signals, so that the position of the scintillation occuring in the crystal is defined. Thanks to the use of a collimator, only quanta which are incident approximately at right angles are admitted, so that the source causing said scintillations is also localized. Signals thus extracted can be displayed as an image on a display screen. This spatial display is disturbed by errors in linearity and uniformity. The existence of such errors can be demonstrated by irradiating the scintillation crystal with a flux of gamma rays having a spatially uniform distribution. Points obtained on the screen of the camera then exhibit a non-uniform spatial distribution. A substantially higher density of points occurs in the areas which correspond to positions which are situated centrally opposite entrance windows of notably centrally situated photomultipliers tubes. This can be explained as follows: when a scintillation occurs in a given point of the scintillation crystal near the axis of one of the central photomultiplier tubes, the point displayed on the screen has been shifted to a position which is situated nearer to the axis of the tube than the actual position of the scintillation. This shifting of the scintillation towards the axis of the photomultiplier is better visible in the central portion of the screen that at the circumference thereof.

One of the causes of the non-linear character of the camera is also formed by the "edge effect" of the optical block, because the optical properties of the surface of the block partly control the manner in which the light is distributed among the photomultipliers. The photomultipliers situated nearest to the edge are more susceptible to this effect.

French Pat. Specification No. 2,219,424 proposes a correction of these errors which utilizes an electronic circuit which readjusts, at a later stage, the signals detected by the photomultipliers of the central portion of the network. As a result, the signal amplifier circuits become extremely complex and the level of the signals of the central photomultipliers is selectively reduced. Moreover, the improvement in linearity is accompanied by a loss of spatial and energetic resolution of the camera.

French Pat. Specification No. 2,168,250 proposes an optical correction method utilizing light-diffusing elements which are comparatively opaque and which are arranged between the scintillation crystal and the optical conductor, underneath each of said photomultiplier tubes in the central zone of the camera. Similarly, French Pat. Specification No. 2,219,423 describes the use of conical elements which transmit half of the scintillation light and reflect this light in different manners, depending on the angle of incidence, said elements being accomodated in the optical conductors on the right side of the centrally situated photomultiplier tubes. These optical correction methods make the construction of the optical block of the camera more complex and also have the drawback that the improved linearity of the camera is obtained at the expense of other properties such as the spatial and energetic resolution.

The invention has for its object to realize a good and readily achievable compromise between on the one hand the spatial linearity and uniformity and on the other hand the spatial and energetic resolution, while at the same time the edge effect is reduced.

This object in accordance with the invention is realized in that a gamma camera of the kind set forth is characterized in that the peripheral part of the surface of the optical conductor is provided, at least at the side of the scintillation crystal, with a diffusive light reflector, the reflection and optical diffusion properties of which are combined in dependence of the wavelength of the scintillation light so that the signal/distance curves of all photomultipliers coincide for scintillations occuring within the useful field of the camera.

Due to the comparatively narrow spectrum of the scintillation light, the visual aspect of the diffusive reflector can be strongly aried in colour, that is to say in a wavelength-dependent manner.

In a general embodiment in accordance with the invention, the diffusive reflector is arranged on a part of the circumference of the surface of the optical conductor at the side of the scintillator and/or on at least a part of the side edge of said optical conductor.

In a preferred embodiment in accordance with the invention, the diffusive reflector is formed by three surfaces having composite optical diffusion properties which are situated very near to each other and which are formed on the one hand by at least a part of the internal surface of a housing for the scintillator and the optical conductor, the apparent colour of said surface being metallic grey, and on the other hand by at least a part of the surface of the optical conductor which is situated opposite said housing surface, and which has been roughened.

The invention will be described in detail hereinafter with reference to the accompanying diagrammatic drawing.

Figure 2:
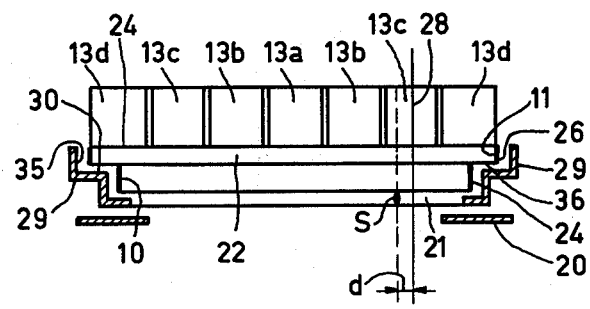
Figure 3:
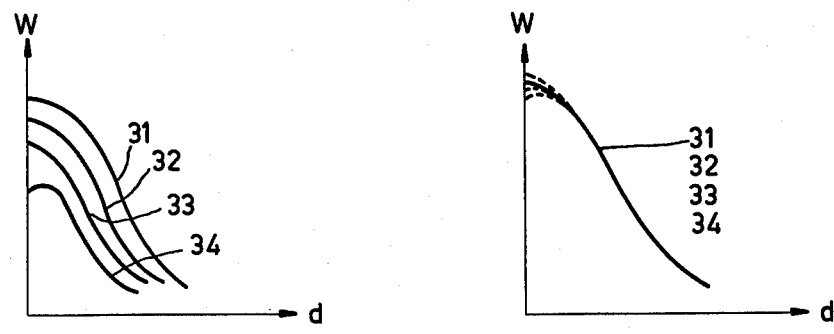

FIG. 1 shows a preferred embodiment of a gamma camera in accordance with the invention, viewed from the side of the photomultiplier tubes, FIG. 2 shows a gamma camera with facilities in accordance with the invention which are arranged on the detection side, viewed in the plane AB of FIG. 1, FIG. 3a shows the signal/distance curves of the detecting photomultipliers of a known gamma camera, and FIG. 3b shows the corresponding signal/distance curves of a gamma camera in accordance with the invention.

FIGS. 1 and 2 show, by way of example, the circumference 10 of a scintillator and the circumference 11 of an optical conductor forming part of a gamma camera having a circular cross-section; however, this cross-section may also be, for example, rectangular. Entrance windows 12 of photomultipliers together form a network and are situated opposite a scintillation crystal 21 on an optical conductor 22. The photomultipliers form, for example, a hexagonal configuration around a central photomultiplier. A photomultiplier 13a is the central photomultiplier of the network. Photomultipliers 13b, 13c, 13d are arranged along a central cross-sectional line AB. For the sake of clarity, two photomultipliers which are symmetrical with respect to the photomultiplier 13a and which are arranged along the cross-section a line AB are denoted by the same reference numeral in the Figures.

FIG. 2, is a cross-sectional view of the entrance of the camera, taken along the line AB in FIG. 1. The scintillator 21 and the optical conductor 22 are more clearly shown. The photomultipliers 13a, 13b, 13c, 13d are arranged on the optical conductor 22. Customarily, the edge 10 of the scintillator 21 coincides approximately with centres 24 of the photomultipliers 13d, whilst the edge 11 of the optical conductor coincides with the outer boundary thereof. An aperture 20 which is arranged in front of the scintillator defines a useful field of the gamma camera.

FIG. 3a shows a series of response curves of photomultiplier tubes arranged along the line AB for the case where a point-like gamma radiation source is displaced along this line. A signal w, originating from the photomultiplier, is plotted along the vertical axis, whilst the distance d between the gamma radiation source and the axis of the relevant photomultiplier is plotted along the horizontal axis. For the photomultiplier 13c, this is the distance d between the axis 28 and the source S. In conformity with the already described deviations, the curves 31, 32, 33 and 34 for the relevant photomultipliers 13a, 13b, 13c and 13d do not coincide, but are situated at an increasingly lower level for the photomultipliers situated nearer to the edge.

In accordance with the invention, an attractive compromise is realized between on the one hand the spatial linearity and uniformity of the gamma camera and on the other hand the spatial and energetic resolution of the camera when the response curves coincide better in the manner shown in FIG. 3b. Both cases are limited to a useful field as defined by the aperture 20.

In order to realize the at least substantially coincident curves, the surface 26 of the optical conductor comprises a diffusive reflector having adapted absorption and diffusion properties, depending on the wavelength of the scintillation light. An adaptation of the diffusive reflector is found in the colour thereof, that is to say a wavelength-dependent degree of reflection and transmission.

In a preferred embodiment in accordance with the invention, the diffusive reflector is formed as shown in FIG. 2. The assembly formed by the scintillator 21 and the optical conductor 22 is arranged in known manner in a housing which is open at the side of the photomultipliers. Surfaces 30 and 35 which are situated opposite the optical conductor 22 have a grey colour and are roughened. The surface 26 of the optical conductor which is situated opposite the surface 30 and a surface 36 thereof which is situated opposite the surface 35 have been roughened. The grey, diffusive reflector used in accordance with the invention is formed by cooperation of the surfaces 30 and 35 with the surfaces 26 and 36 which are situated at a very short distance from each other and whose reflection and optical diffusion properties are combined in respect of their colour and surface condition.

It will be clear that the invention, which has been described only with reference to the most commonly used circular shape of the cross-section of the optical block, also relates to a gamma camera whose optical block has a polygonal cross-section and which is, for example, rectangular or square.

What is claimed is:

1. In a gamma camera which comprises:
a scintillation crystal having a first side and an opposite second side; an optical conductor having a first side disposed against the second side of the scintillation crystal and a second opposite side, a transverse dimension of the optical conductor being larger than a transverse dimension of the scintillation crystal so that a portion of the surface of the optical conductor extends beyond the periphery of the scintillation crystal; a network of photomultiplier tubes including peripheral photomultipliers having entrance faces situated adjacent the second side of the optical conductor, the entrance faces of the peripheral photomultiplier tubes projecting beyond the periphery of the scintillation crystal; aperture means for defining the useful field of the gamma camera disposed adjacent the first side of the scintillation crystal; and a metal housing which surrounds the optical conductor and the scintillation crystal; the improvement comprising:
diffuse light reflector means provided at least on the portion of the surface of the optical conductor which extends beyond the periphery of the scintillation crystal, the reflection and optical diffusing properties of the reflector being a function of the wavelength of the scintillation light, for compensating the signal/distance curves of the photomultiplier tubes so that the signal/distance curves for all photomultiplier tubes in the network substantially coincide for all scintillations occurring within the useful field of the gamma camera.

2. A gamma camera as claimed in claim 1 wherein the optical conductor, the scintillation crystal and the diffuse light reflector means are circular and are disposed along a common axis.

3. A gamma camera as claimed in claim 1 or 2 wherein the diffuse reflector means comprise a roughened area on the surface of the optical conductor and an adjacent inner surface of the housing, the apparent color of the adjacent surface of the housing being metallic gray, the roughened surface and the adjacent surface of the housing being sufficiently close together so that the composite optical properties thereof provide a diffuse light reflector.

* * * * *